(12) United States Patent
Erikson

(10) Patent No.: US 9,776,477 B1
(45) Date of Patent: Oct. 3, 2017

(54) SUNSHADE SYSTEM

(71) Applicant: Charles Erikson, North Las Vega, NV (US)

(72) Inventor: Charles Erikson, North Las Vega, NV (US)

( * ) Notice: Subject to any disclaimer, the term of this patent is extended or adjusted under 35 U.S.C. 154(b) by 0 days.

(21) Appl. No.: 15/087,121

(22) Filed: Mar. 31, 2016

(51) Int. Cl.
*B60J 3/00* (2006.01)
*B60J 3/02* (2006.01)
*B60K 37/04* (2006.01)
*B60K 37/02* (2006.01)

(52) U.S. Cl.
CPC .......... *B60J 3/0213* (2013.01); *B60J 3/0204* (2013.01); *B60K 37/02* (2013.01); *B60K 37/04* (2013.01); *B60J 3/0247* (2013.01)

(58) Field of Classification Search
CPC ...................................................... B60J 3/0204
USPC ........................................................ 296/97.7
See application file for complete search history.

(56) References Cited

U.S. PATENT DOCUMENTS

| | | | |
|---|---|---|---|
| 4,005,899 A | 2/1977 | Rigney | |
| 5,002,327 A | 3/1991 | Bickford | |
| 5,115,345 A | 5/1992 | Hobson et al. | |
| D360,199 S | 7/1995 | Shu-Ying | |
| 5,639,524 A * | 6/1997 | Lin ......................... | B60J 1/2011 |
| | | | 296/97.1 |
| 6,648,396 B2 * | 11/2003 | Monahan ............... | B60J 1/2011 |
| | | | 160/370.21 |
| 2006/0066129 A1 | 3/2006 | Roger | |
| 2009/0090756 A1 | 4/2009 | Day et al. | |
| 2015/0370392 A1 * | 12/2015 | Dale ........................ | G06F 3/011 |
| | | | 345/173 |

* cited by examiner

*Primary Examiner* — Joseph D Pape

(57) ABSTRACT

A sunshade system for shading a display in a vehicle includes a vehicle that has a dashboard, a vent and a display. Each of the vent and the display re positioned on the dashboard. The vent is positioned above the display and the display may be observed. A shade is removably coupled to the vent. The shade may shade the display from sunlight thereby enhancing visibility of the display.

5 Claims, 5 Drawing Sheets

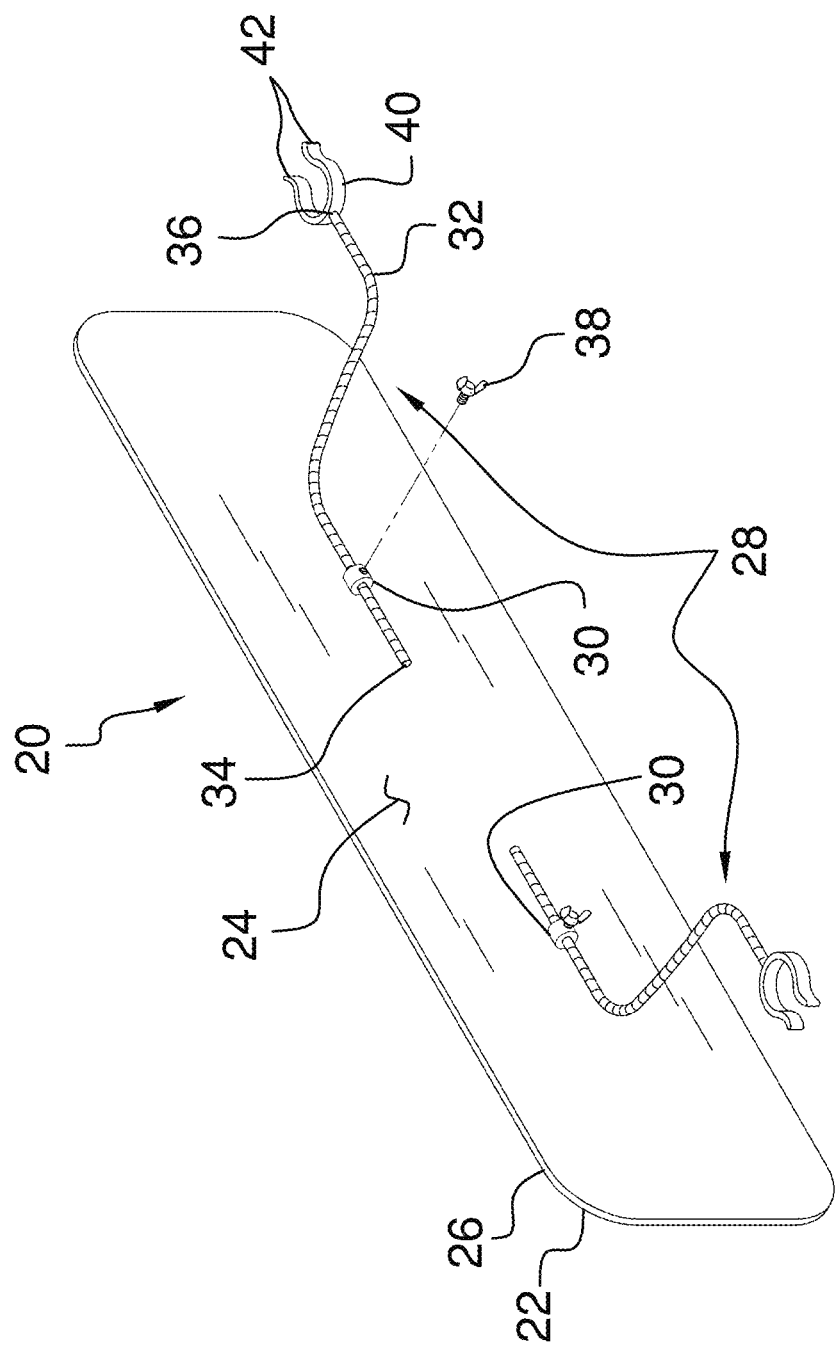

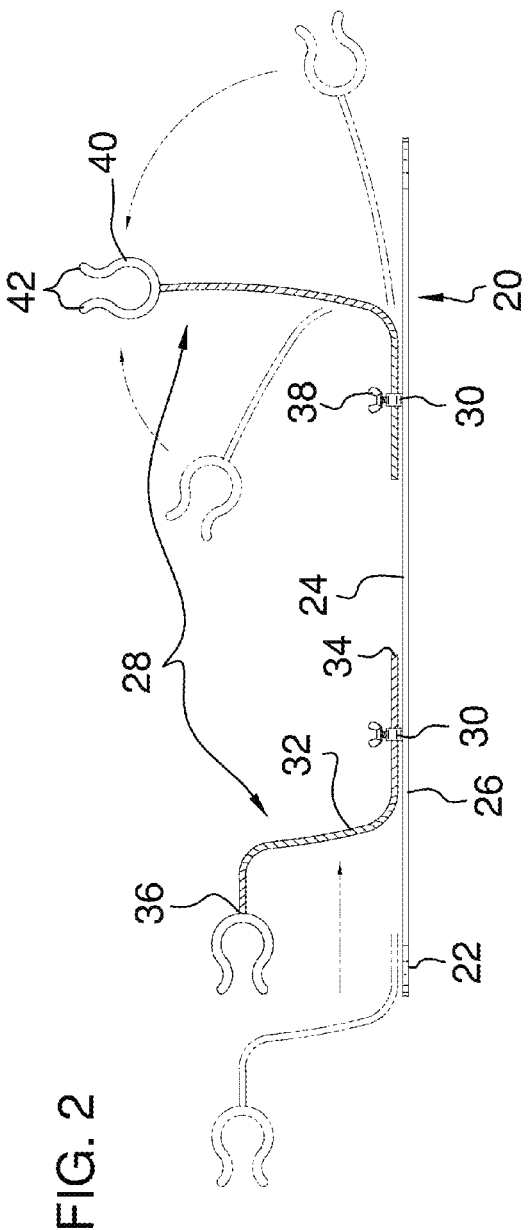
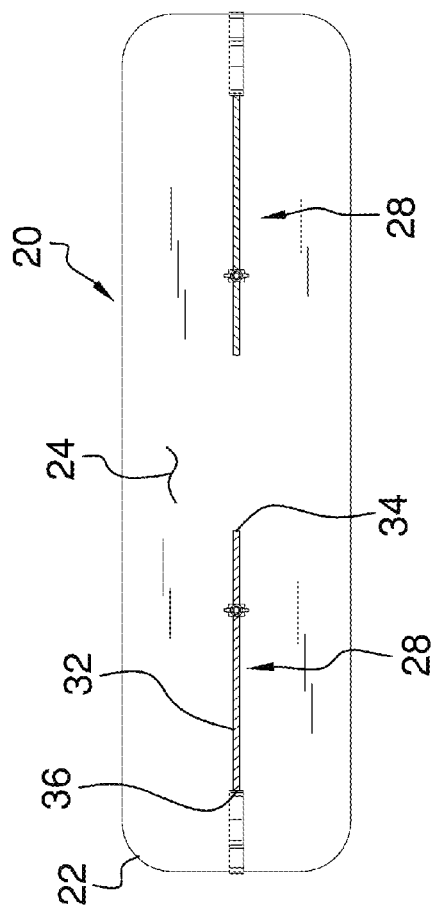

SUNSHADE SYSTEM

BACKGROUND OF THE DISCLOSURE

Field of the Disclosure

The disclosure relates to sunshade devices and more particularly pertains to a new sunshade device for shading a display in a vehicle.

SUMMARY OF THE DISCLOSURE

An embodiment of the disclosure meets the needs presented above by generally comprising a vehicle that has a dashboard, a vent and a display. Each of the vent and the display re positioned on the dashboard. The vent is positioned above the display and the display may be observed. A shade is removably coupled to the vent. The shade may shade the display from sunlight thereby enhancing visibility of the display.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a back perspective view of a sunshade system according to an embodiment of the disclosure.

FIG. 2 is a right side view of an embodiment of the disclosure.

FIG. 3 is a back view of an embodiment of the disclosure.

DESCRIPTION OF THE PREFERRED EMBODIMENT

Figure 4:
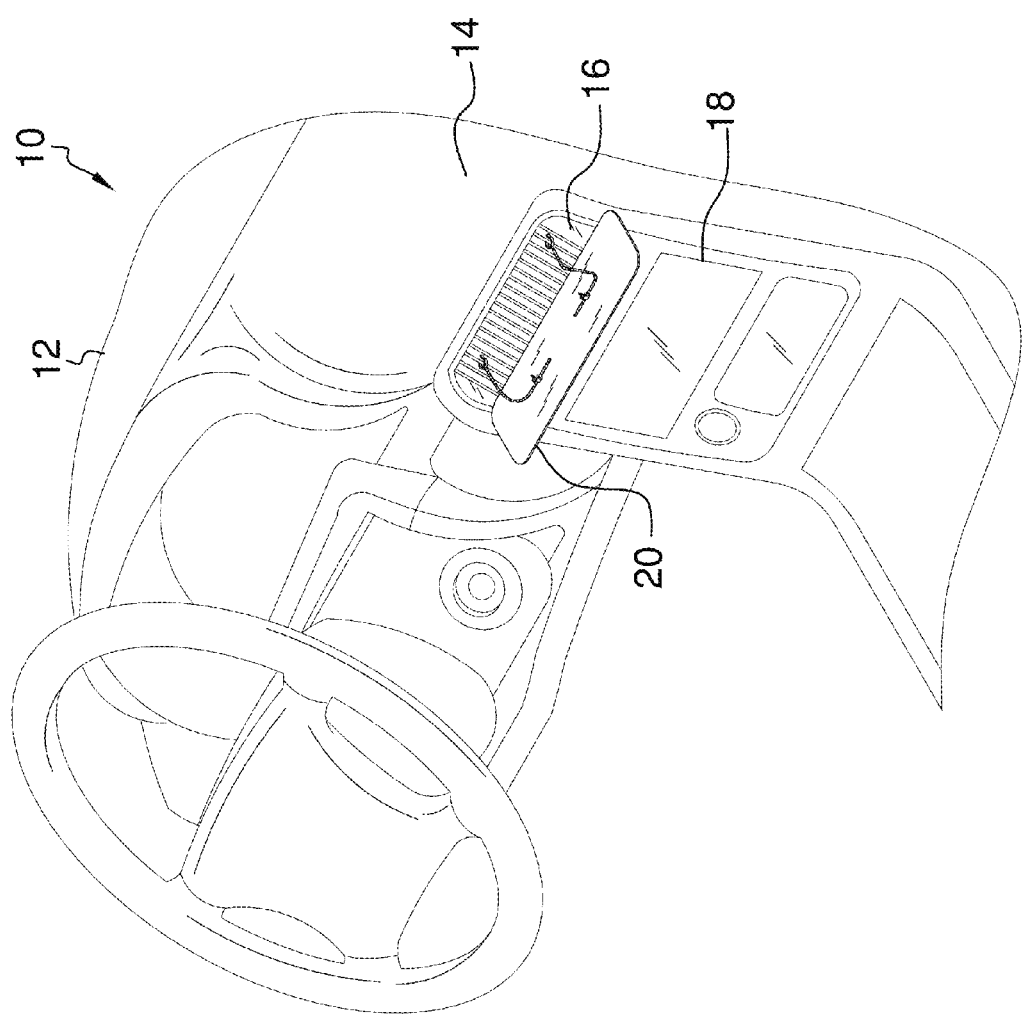
FIG. 4 is a perspective in-use view of an embodiment of the disclosure.

With reference now to the drawings, and in particular to FIGS. 1 through 6 thereof, a new sunshade device embodying the principles and concepts of an embodiment of the disclosure and generally designated by the reference numeral 10 will be described.

As best illustrated in FIGS. 1 through 6, the sunshade system 10 generally comprises a vehicle 12 that has a dashboard 14, a vent 16 and a display 18. Each of the vent 16 and the display 18 is positioned on the dashboard 14. The vent 16 is positioned above the display 18 and the display 18 may be observed. The vehicle 12 may comprise a passenger vehicle or the like. The display 18 may comprise an onboard GPS display or the like. The vent 16 may comprise a heater vent or the like.

A shade 20 is removably coupled to the vent 16 and the shade 20 shades the display 18 from sunlight thereby enhancing visibility of the display 18. The shade 20 comprises a panel 22 that has a first surface 24 and a second surface 26. A pair of coupler 28 is provided and each of the couplers 28 is removably coupled to the first surface 24. Each of the couplers 28 removably engages the vent 16 such that panel 22 is removably coupled to the vent 16. The panel 22 is horizontally oriented on the vent 16. Thus, the panel 22 may shade the display 18. Each of the couplers 28 is comprised of a resiliently flexible material. Thus, the panel 22 is positionable at a selected orientation with respect to the vent 16.

Each of the couplers 28 comprises an eyelet 30 that is coupled to the first surface 24. An arm 32 is provided and the arm 32 has a first end 34 and a second end 36. The first end 34 is extended through the eyelet 30 such that arm 32 is removably coupled to the eyelet 30. The arm 32 is comprised of the resiliently flexible material. The arm 32 may be manipulated into a selected shape and the arm 32 is retained in the selected shape.

A fastener 38 extends through the eyelet 30 and engages the arm 32. Thus, the arm 32 is removably retained in the eyelet 30. The fastener 38 may comprise a wing nut or the like. A clip 40 is provided and the clip 40 includes has a pair of spaced grips 42. The clip 40 is coupled to the second end 36 of the arm 32. The spaced grips 42 are biased toward each other and each of the spaced grips 42 frictionally engages the vent 16.

Figure 5:
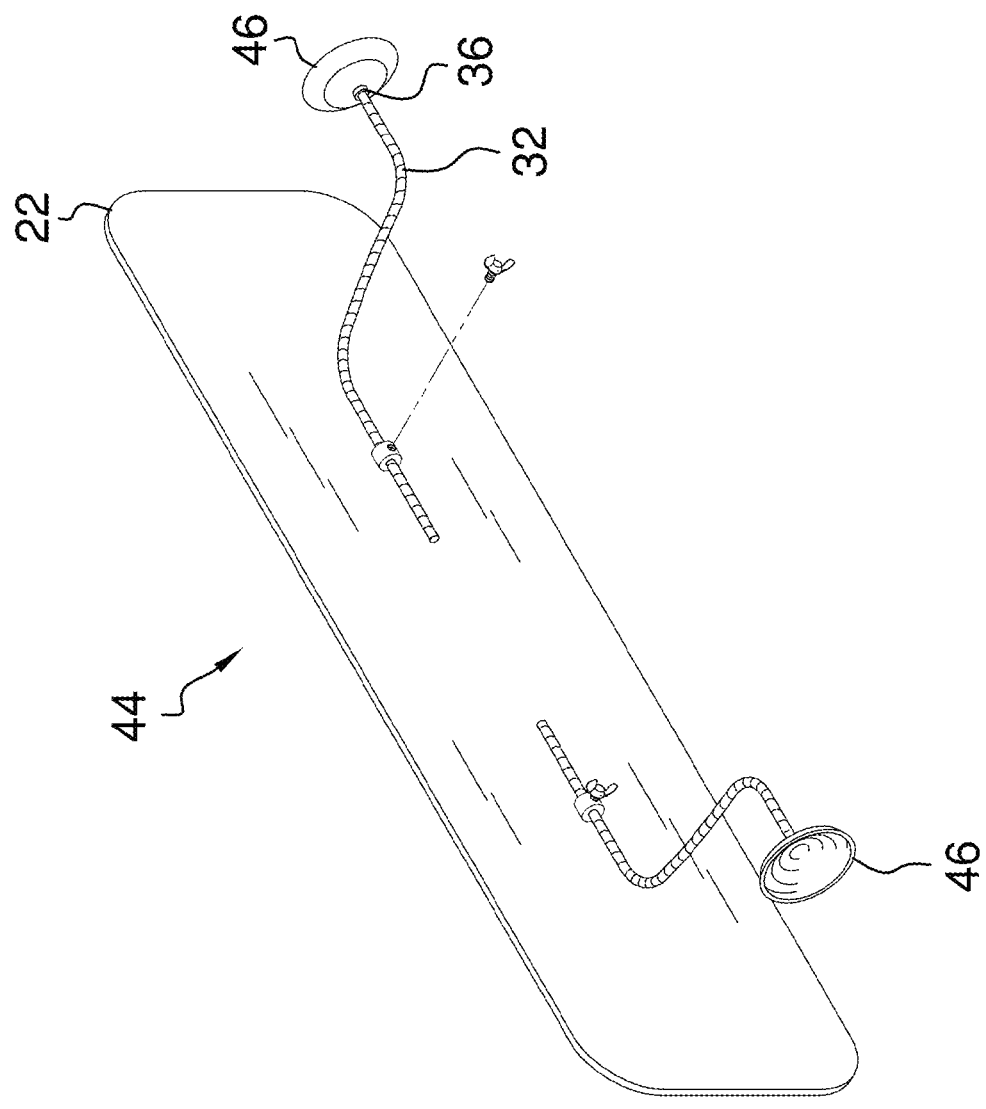
FIG. 5 is a perspective view of an alternative embodiment of the disclosure.
Figure 6:
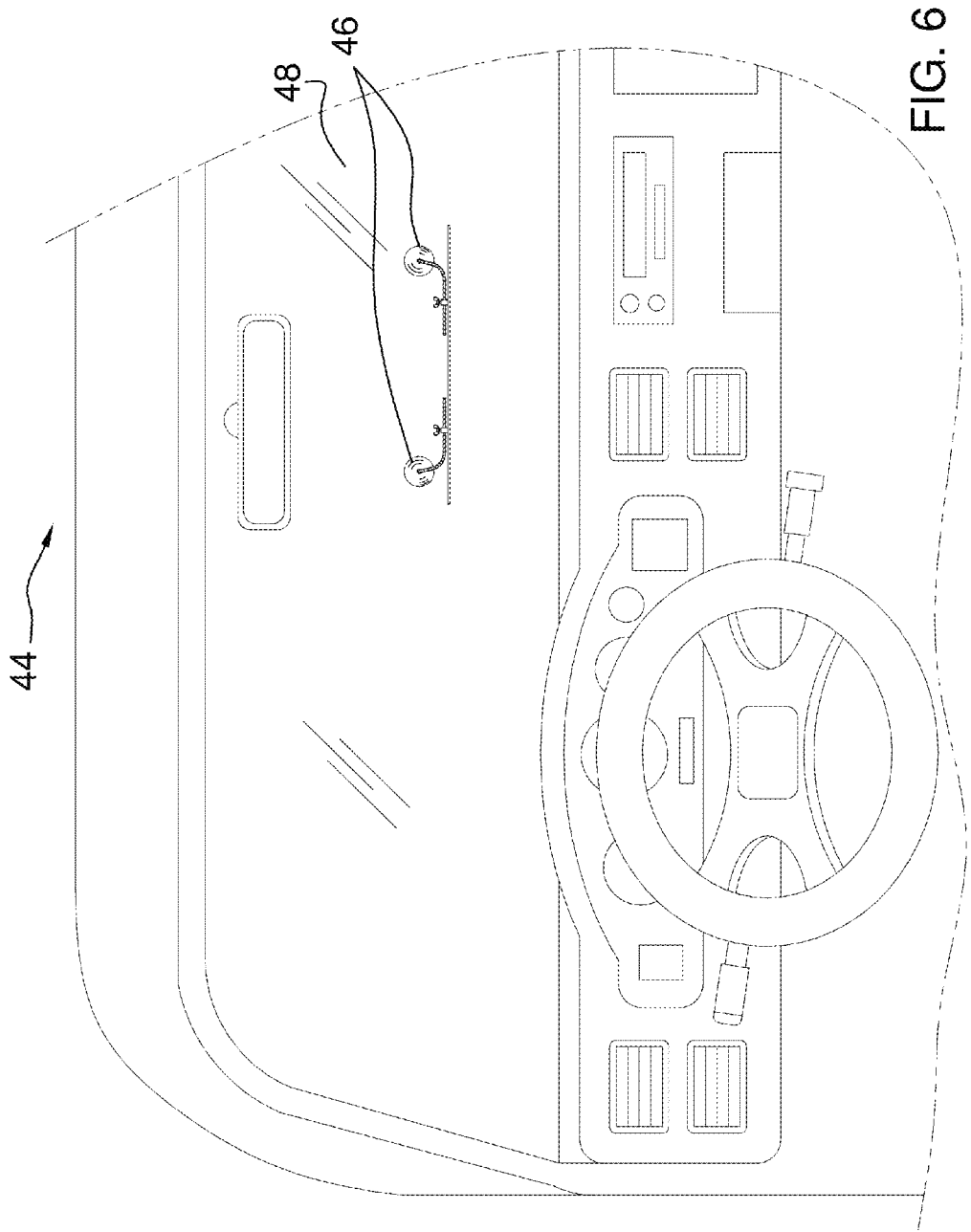
FIG. 6 is a perspective in-use view of an alternative embodiment of the disclosure.

In an alternative embodiment 44 as shown in FIGS. 5 and 6, a suction cup 46 may be coupled to the second end 36 of the arm 32. The suction cup 46 corresponding to each of the couplers 28 may suctionally engage the vehicle's windshield 48. Thus, the panel 22 may be positioned on the windshield 48 to shade the display 18.

In use, the arm 32 corresponding to each of the couplers 28 is coupled to the eyelet 30 corresponding to each of the couplers 28. The clip 40 corresponding to each of the couplers 28 is coupled to the vent 16. The arm 32 corresponding to each of the couplers 28 is manipulated to position the panel 22 in a selected orientation. Thus, the panel 22 shades the display 18 from sunlight thereby reducing glare on the display 18.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sunshade system being configured to shade a display in a vehicle, said system comprising:

a vehicle having a dashboard, a vent and a display, each of said vent and said display being positioned on said dashboard, said vent being positioned above said display, said display being configured to be observed;

a shade being removably coupled to said vent wherein said shade is configured to shade said display from sunlight thereby enhancing visibility of said display;

a panel having a first surface;

a pair of couplers, each of said couplers being removably coupled to said first surface, each of said couplers removably engaging said vent such that said panel is removably coupled to said vent, said panel being horizontally oriented on said vent wherein said panel is configured to shade said display, each of said couplers being comprised of a resiliently flexible material such that said panel is positionable at a selected orientation with respect to said vent, each of said couplers comprising an eyelet being coupled to said first surface; and an arm having a first end and a second end, said first end being extended through said eyelet such that said arm is removably coupled to said eyelet, said arm being comprised of said resiliently flexible material.

2. The system according to claim 1, wherein said shade comprises a panel having a first surface and a second surface.

3. The system according to claim 1, further comprising a fastener extending through said eyelet and engaging said arm such that said arm is removably retained in said eyelet.

4. The system according to claim 1, further comprising a clip having a pair of spaced grips, each of said clip being coupled to said second end of said arm, said grips being biased toward each other, each of said grips frictionally engaging said vent.

5. A sunshade system being configured to shade a display in a vehicle, said system comprising:

a vehicle having a dashboard, a vent and a display, each of said vent and said display being positioned on said dashboard, said vent being positioned above said display, said display being configured to be observed; and a shade being removably coupled to said vent wherein said shade is configured to shade said display from sunlight thereby enhancing visibility of said display, said shade comprising:

a panel having a first surface and a second surface, a pair of couplers, each of said couplers being removably coupled to said first surface, each of said couplers removably engaging said vent such that said panel is removably coupled to said vent, said panel being horizontally oriented on said vent wherein said panel is configured to shade said display, each of said couplers being comprised of a resiliently flexible material such that said panel is positionable at a selected orientation with respect to said vent, each of said couplers comprising:

an eyelet being coupled to said first surface, an arm having a first end and a second end, said first end being extended through said eyelet such that said arm is removably coupled to said eyelet, said arm being comprised of said resiliently flexible material, a fastener extending through said eyelet and engaging said arm such that said arm is removably retained in said eyelet, and a clip having a pair of spaced grips, each of said clip being coupled to said second end of said arm, said grips being biased toward each other, each of said grips frictionally engaging said vent.

* * * * *